Aug. 7, 1962 E. C. CLARKE ETAL 3,048,019
RAM CONTROL SYSTEM
Filed June 23, 1960 7 Sheets-Sheet 1

INVENTORS:
EUGENE C. CLARKE
HENRY A. WEYER
BY Howson & Howson
ATTYS

INVENTORS:
EUGENE C. CLARKE
HENRY A. WEYER
BY Howson & Howson
ATTYS.

Aug. 7, 1962   E. C. CLARKE ETAL   3,048,019
RAM CONTROL SYSTEM
Filed June 23, 1960   7 Sheets-Sheet 4

INVENTORS:
EUGENE C. CLARKE
HENRY A. WEYER
BY Howson & Howson
ATTYS:

Aug. 7, 1962

E. C. CLARKE ETAL 3,048,019

RAM CONTROL SYSTEM

Filed June 23, 1960

INVENTORS:
EUGENE C. CLARKE
HENRY A. WEYER

BY Howson & Howson

ATTYS.

Aug. 7, 1962   E. C. CLARKE ETAL   3,048,019
RAM CONTROL SYSTEM
Filed June 23, 1960   7 Sheets-Sheet 7

FIG. 18.

INVENTORS
EUGENE C. CLARKE
HENRY A. WEYER
BY Howson & Howson
ATTYS.

3,048,019
RAM CONTROL SYSTEM
Eugene C. Clarke and Henry A. Weyer, Chambersburg, Pa., assignors to Chambersburg Engineering Company, Chambersburg, Pa., a corporation of Pennsylvania
Filed June 23, 1960, Ser. No. 38,298
18 Claims. (Cl. 60—97)

This invention relates to fluid pressure actuated devices and more particularly to control of the actuation of the ram member or members of said device. The invention is applicable to impacters and forging apparatus of all types, but is particularly applicable to devices having two forging rams or impacters which are arranged horizontally in opposed relation to each other and are moved toward each other to engage an interposed work piece to forge the same. The present invention also covers means whereby selection can be made between single stroke and multiple stroke repeater action by the ram.

Heretofore, impacters and rams have been controlled as to their actuation by positioning a control valve in response to fluid pressure actuation. Mechanical systems have also been employed but have been less widely used in recent years. The present invention enables combination of the best features of mechanical and fluid control. This combination permits greater flexibility and range of control, while at the same time maintaining a simple structure. Moreover, it lends itself to combination in many cases with existing mechanical structure for sensing ram position. Such structure is widely used in connection with the opposed ram structure of horizontal impacters, and the present invention has particular application to such structures.

More specifically, the present invention is directed to a system in which a position sensing element on the frame senses ram position relative to the frame. The ram causes the sensing element to assume a position relative to the frame representative of ram position. The sensing means as a practical matter is usually a mechanical element in contact both with the ram and the frame and movable in response to changes in ram position relative to the frame so that for each ram position the sensing means assumes a different position. In accordance with the present invention, actuation of the control is achieved by allowing the sensing means to operate the control valve which determines when and how the ram will operate. It is as a result of control adjustment that the sensing means changes its relative position both with respect to the frame and the ram so that the sensing means will assume a set of positions different from what it assumed in a previous position for corresponding ram positions relative to the frame. In essence then the present invention involves the use of the sensing means as an intermediary between the actuation control means and the control valve whereby the control valve position is dependent not only upon the actuation control means but upon the ram position.

The present invention also provides means whereby repeater action may be achieved. This is achieved fundamentally by change of coupling between the sensing means and the control valve. As a practical matter, this is done between the sensing means and the control valve. For practical purposes, the adjustment is one whereby the length of control valve piston stroke is increased for the same amount of movement of the sensing means.

Although it will be clear to those skilled in the art that the present invention has wider application than in the embodiment about to be described, reference to a specific embodiment will facilitate an understanding of the invention. The accompanying drawings show a preferred embodiment of the present invention applied to a double ram horizontal impacter system in which it has special advantages.

Figure 1:
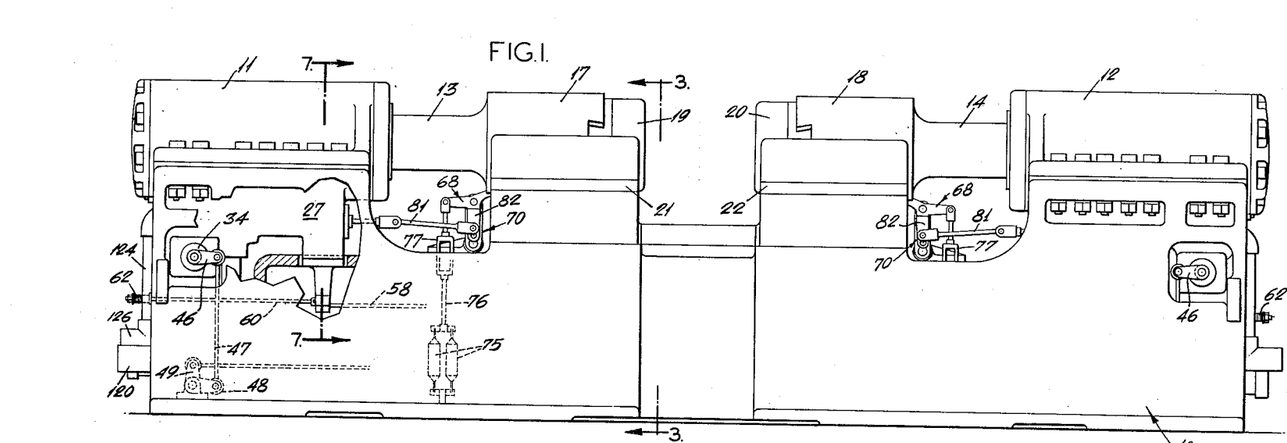
FIG. 1 illustrates a front elevational view of a double ram horizontal impacter employing the present invention.

Referring first to FIG. 1, the apparatus comprises a supporting frame 10 on which there are provided a pair of horizontally aligned and spaced fluid cylinders 11 and 12. A pair of movable rams 13 and 14 extend respectively from the inner ends of the cylinders 11 and 12. These rams terminate in pistons (e.g. piston 15, FIG. 4) within the cylinders which enable operation of said rams toward and away from each other by pressurized fluid (e.g. compressed air) supplied to the cylinders. The apparatus illustrated is a forging apparatus and, therefore, the rams 13 and 14 are in the form of impacters having die-carrying heads 17 and 18 on which forging dies 19 and 20 are carried. Guides 21 and 22 serve to accommodate cooperating portions on the moving heads of the impacter rams.

Figure 4:
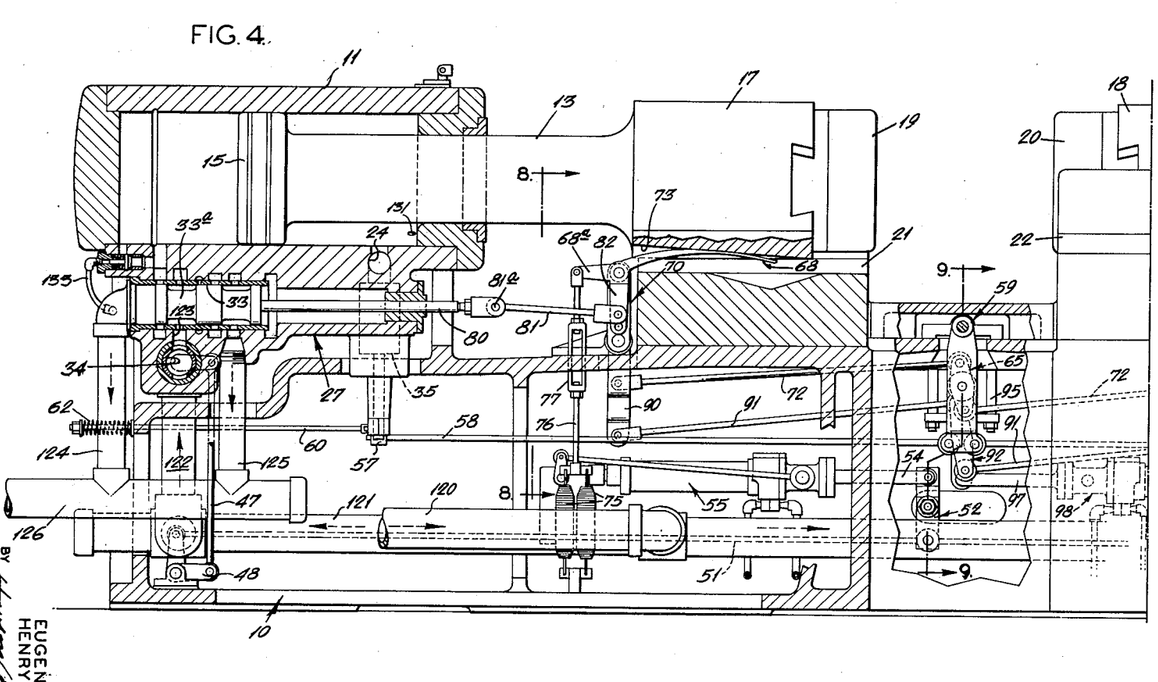
FIG. 4 is a cross sectional view taken in the center plane of the rams but showing the ram structure, except for a small part, unsectioned.

The valve chests for cylinders 11 and 12 are similar to one another and have corresponding components. The components are mirror images of one another so that illustration of one suffices for both and wherever they are shown corresponding parts are given corresponding numbers. Valve chest 27, as shown in FIG. 4, comprises a control valve 33, a throttle valve 34 and a correcting valve 35. The control valve 33 is a slide valve, while the throttle valve and the correcting valve are rotary valves. Similar valves are provided in a valve chest associated with cylinder 12, in accordance with the symmetry previously discussed. The control valves serve to control the operation of the rams 13 and 14 in response to operation of these valves. The throttle valves serve to adjust the fluid flow to the cylinders according to the setting of these valves, thereby determining the speed of operation of the impacters. The correcting valves tend to correct any tendency for the rams to move out of step with one another. Operation of the valves will be best understood by reference to FIG. 18.

The throttle valves 34 are set by placing their throttle levers 46 (FIG. 1) in a desired angular position. Each throttle lever 46 is part of an interconnected linkage system best seen in FIG. 18. In this system the end of each throttle lever 46 is connected by a link 47 to lever 48. Lever 48 is part of a crank system composed of levers 48 and 49 fixed to shaft 50 at its opposite ends. Shaft 50 is journaled to rotate in a bearing on the frame. Similar long links 51 connect both levers 49 to the same end of swing arm 52. Swing arm 52 is pivoted by pin 53 which is fixed to the frame at the machine's center plane between the rams (see FIG. 9). The end of swing arm 52 opposite to that pivotally connected to links 51 is connected to piston shaft 54 of drive unit 55. The cylinder of drive unit 55 is connected to the frame and by fluid flow in a manner which will be hereafter described positions swing arm 52 and hence valves 34 through the described linkage system. Because both links 51 are connected to the same end of swing arm 52 movement of the arm causes the valve controls of valves 34 to move in opposite directions. The valves are so designed that this movement causes adjustment of valve opening in the same amount so that the rams will remain in synchronism for each position of swing arm 52 and valves 34. It will be understood that the throttle valve 34, once it is adjusted, is not moved unless it is desired to change the speed of the rams. Such adjustment is achieved remotely by fluid controls of drive unit 55.

The correcting valves 35 are actuated only in the event that a non-synchronous condition of the impacters develops. These valves are actuated differentially by a linkage arrangement similar to that described in United States Patent 2,729,943 to Eugene C. Clarke and Henry A. Weyer. The correcting valves 35 are each connected through lever 57 to links 58. These links are pivotally connected to the lower end of a swing arm 59, the upper end of which is pivoted at 61 (as may be seen in FIG. 9) to the machine frame in the central plane of the apparatus between the rams. Arms 57 are also connected to rods 60 and the rods are, in turn, connected to the frame by spring 62 tending to urge the valves into a predetermined position. Swing arm 59 is pivotally supported by pin 61 on a suitable bracket 64 fixed to the machine frame 10. A rocker arm 65 is pivotally connected by pin 66 to the swing arm 59 intermediate the ends of the arm. A pair of thin curved levers 68 which provide sensing elements are fixed to pivot rods 69 rotatably supported in one end of a special adjustable frame 70 to be described. Also rigidly connected to rod 69 is lever 71 whose free end is pivotally connected to one end of rocker arm 65 by links 72. The arrangement is such that one link 72 is connected to one end and the other link 72 is connected to the other end of rocker arm 65.

The bottoms of ram heads 17, 18 are each provided with a sloping cam surface 73 against which one of the sensing levers 68 bears. Each sensing lever is resiliently urged into this position by spring means 75 which is connected between the frame and a rod 76 pivotally connected to a rearwardly projecting appendage portion 68a of sensing levers 68. The slope of surface 73 is such that, as the rams move together, the springs 75 urge the levers 68 further upward. The force urging the levers upward may be adjusted for both levers or for one relative to the other by use of the turnbuckle 77 which interconnects parts of rod 76 between lever 68 and tension spring 75.

As the rams move through their work or power stroke the sensing levers 68 urged against their bottom surfaces by the action of their biasing springs assume successive unique positions representative of ram position. If the movements of the detecting elements are precisely synchronous, the rocker arm 65 is simply moved about its pivot 66 and there is no movement of the swing arm 59. However, if the movements of the detector elements 68 are not synchronous, there is an unbalance of the forces acting on the rocker arm 65 and, consequently, there is a resultant force on the swing arm 59 through pivot 66 that moves the swing arm 59 in one direction or the other according to the direction of unbalance. The movement of swing arm 59 effects differential operation of the correcting valves 35 through links 58 and levers 57. Levers 57 are arranged so that such movement tends to move valves 35 in a direction to correct the non-synchronous condition which caused the unbalance.

Figures 7, 8:
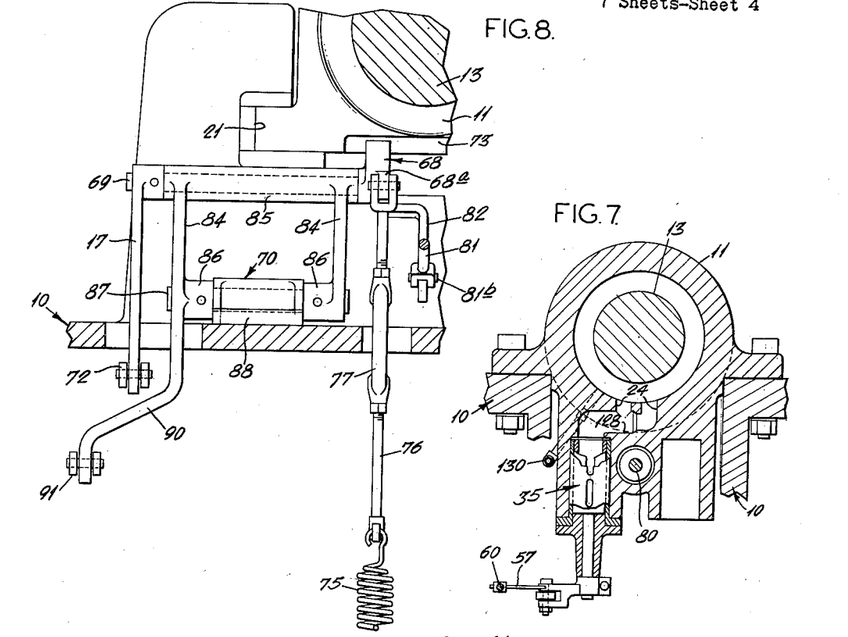
FIG. 7 is a partial sectional view taken along line 7—7 of FIG. 1.
FIG. 8 is a partial sectional view taken along line 8—8 of FIG. 4.
Figure 9:
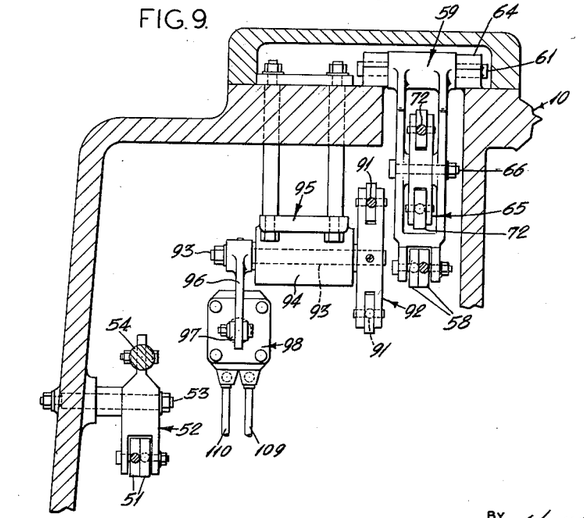
FIG. 9 is a partial sectional view taken along line 9—9 of FIG. 4.
Figure 18:
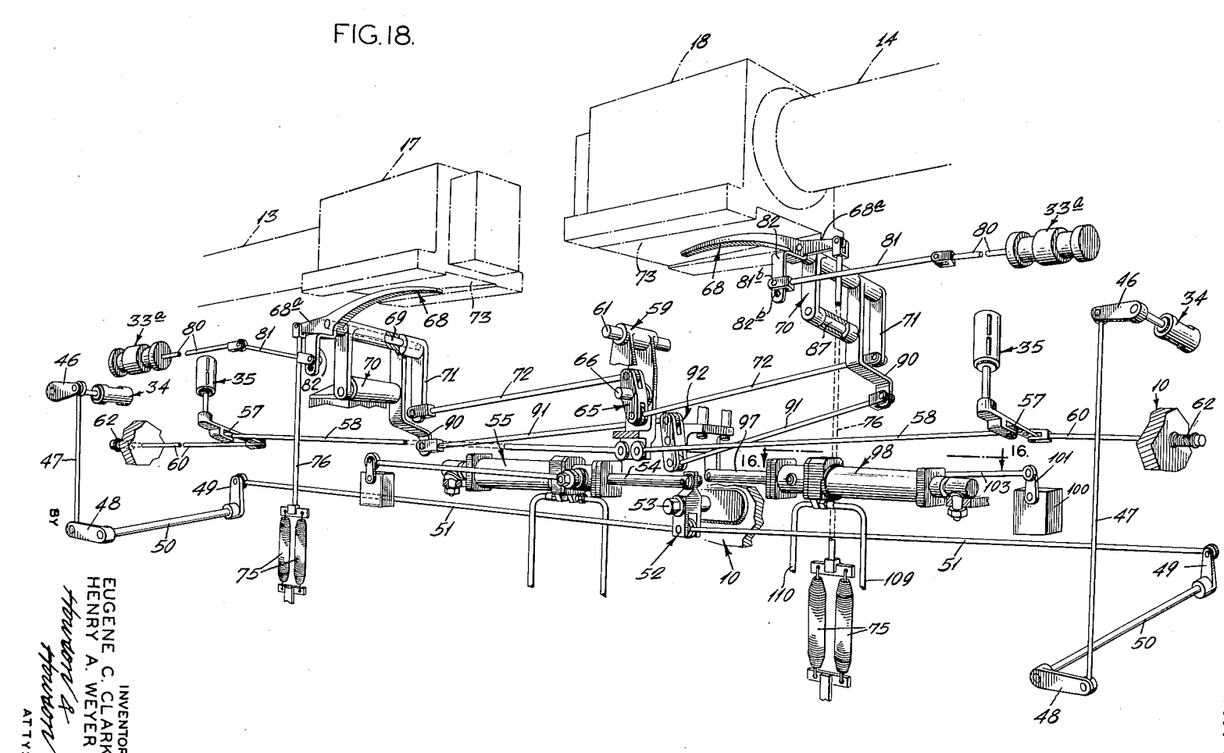
FIG. 18 is a schematic perspective view showing the control elements of the various valves of a horizontal double ram impact machine and the links, couplings, springs, actuators and sensing elements which determine the positions of the control elements.

The specific improvement of the present invention will now be considered with reference particularly to FIGS. 4, 8 and 9 as well as FIG. 18. In the prior art actuation has been controlled by direct control of control cylinder 33 usually by attaching the piston 33a to a directly actuating device. In this case, however, as can be seen in FIG. 4 the piston 33a is connected through piston rod 80 by link 81 to lever arm 82. Pivotal connections 81a and 81b at the ends of the link 81 permit great freedom of movement in the plane of the lever arm 82 since that lever rotates about rod 69 parallel to the pivotal connections 81a and 81b. It will be recalled that rod 69 is fixed to lever 68 to turn with it, and lever 82 may be part of arm 68 or fixed to the shaft 69 so that it rotates with the shaft and lever 68 as a unit. Comparison of FIGS. 4 and 8 will clarify the structure.

From what has been previously said it will be seen that the sensing lever 68 as it is deflected by the cam surface 73 of the ram must rotate shaft 69 to which it is affixed and this will be reflected in a change of position of lever 82. As can be seen in FIG. 4, in addition to the hole 82a in which pin 81b is presently located there is a hole 82b at a larger radius in arm 82 to which pin 81b may be moved for repeat action. The difference in the effects achieved by placing the pin 81b in each of these two positions is a difference in the linear movement transferred to the piston 33a by movement of the sensing lever 68. In the position shown in FIG. 4 the movement is not enough to move the piston from an actuating position to the on center inactive valve position. But if pin 81b were placed in hole 82b the piston would be moved beyond the stable position to a position to cause continued reciprocation until the whole structure would be repositioned in a manner which will be explained hereafter.

From FIGS. 4, 18 and especially from FIG. 8 it will be seen how the sensing lever support shaft 69 which provides the axis of rotation for the sensing lever is supported on sub-frame structure 70. This sub-frame includes a pair of parallel arms 84 which support the bearing 85 for shaft 69 parallel to the axis of bushings 86 through which shaft 87 extends and to which shaft 87 is fixed. Shaft 87 in turn is journaled in a bearing 88 on the main support frame 10. Providing a rigid extension to the sub-frame 70 is an arm 90 which extends one of the arms 84 on the remote side of shaft 87. Rotational movement of lever or crank arm 90 about the shaft 87 serves to move sub-frame 70 and hence to shift the support member 85 for sensing lever shaft 69. Arm 90 is connected by link 91 to a rocker arm 92 (see FIG. 9). This rocker arm is fixed to a rotatable shaft 93 journaled in a bearing 94 supported on the frame 10 by a suitable structure 95. Also rigidly fixed to the shaft 93 is an arm 96 which is pivotally connected to a rod extension 97 of the cylinder of hydraulic actuator 98. The piston of actuator 98 is fixed to the frame so that the cylinder moves relative to the frame by fluid action in a manner which will be described. By use of actuator 98 the control valve system may be remotely controlled by manual control device 100. This control is exerted through a lever 101 driving a connecting rod 103 to actuate the system in a manner which will be described hereafter.

By reference to FIGS. 18, 9 and 8, it can be seen that as the lever 96 is rotated by actuator 98 an accompanying displacement of rocker arm 92 will take place as shaft 93 to which both arm 92 and actuator 98 are fixed turns. Turning rocker arm 92 will cause the links 91 to pull levers 90 through a small arc into a new position. The nature of the resulting rotation about shaft 87 can be appreciated from FIG. 8. This rotation repositions the bushing 85 and hence the center of rotation for the lever 68. Although this movement is rotational, the angular movement is small and the shaft 69 is so positioned that movement through the small arc provides relatively great horizontal displacement but relatively small vertical movement. Thus there is only a slight change in effect of the cam surface 73 in a given position on the sensing lever 68 whereas there is a significant lateral or horizontal displacement of the arm 82. This displacement of shaft 69 moves connecting rod 81 and piston rod 80 to a corresponding amount and accordingly displaces the piston 33a in cylinder 33. Sufficient movement to change the position of the control valve from an active to inactive position, or vice versa, will barely change the position of the sensing lever. It will be appreciated as a general proposition that by thus changing the position of the control valve, impact of the machine may be initiated or alternatively the rams may be retracted from impact position. The arrangement may be such that when the rams meet, the linear horizontal pull which has occurred due to rotation of the sensing levers 68 is sufficient to shut off control valve 33. Then a further repositioning of the control valve is necessary in order to position the control valve for the return stroke of the ram. Moreover, by the position selected, the distance the ram is returned may be controlled or, alternatively the spacing between the heads at impact may be controlled. Thus, the system of the present invention provides means whereby the sensing lever 68 not only controls actuation of the rams but also tends to determine the size of the stroke, i.e., the distance the rams travel and the positions which the rams occupy both before and after the stroke. As will be seen hereafter this same system makes it possible for the ram to produce repeated strokes automatically.

Figure 16:
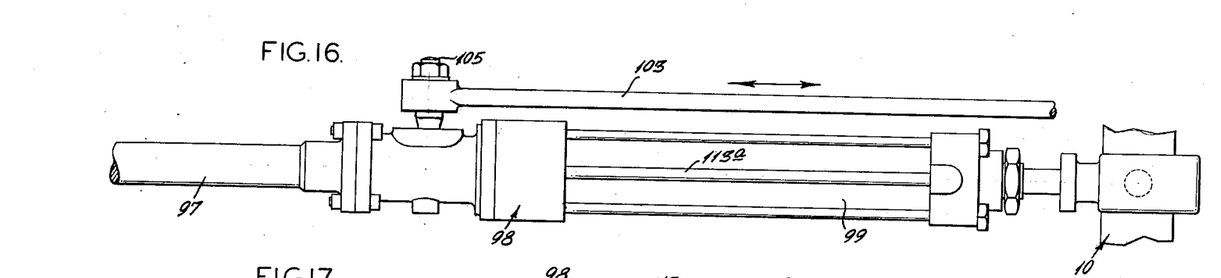
FIG. 16 is a plan view from above of the actuator structure seen in FIG. 4.
Figure 17:
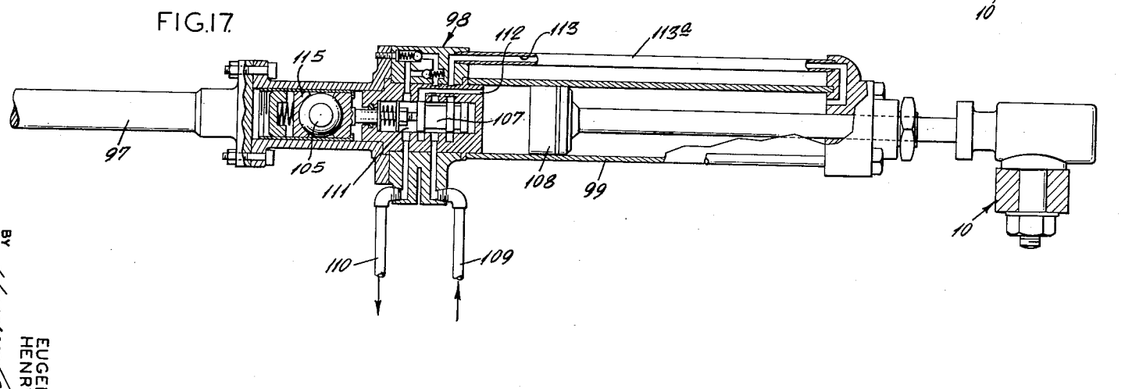
FIG. 17 is a side view partially in section showing the actuator structure in the same position as FIG. 16.

Control of position may be provided by a device such as that shown in FIGS. 16 and 17 although other types of devices for the same purpose may be used. In practice both controller 55 which regulates throttle valve 34 and regulator 98 which regulates the control valve 33 may be of the same type of construction and this will be understood in the following discussion. However, for the sake of clarity the device will be discussed in terms of device 98.

It will be seen that this device is a mechanically actuated hydraulic unit employing an incompressible liquid as its fluid. As indicated the mechanical system may be arranged to respond to a signal from a remote source. For example, a remote actuator may control a synchro motor 101 to rotate arm 102 to a predetermined position (FIG. 18) and arm 103 is thereby positioned at a particular location. The effect of the resulting longitudinal movement of arm 103 can be seen from FIGS. 16 and 17. The effect is to move a stem 105 which operates a valve 107. It is the cylinder 99 which is movable relative to the piston 108 which is fixed to the machine frame. The mechanical position assumed by rod 103 causes stem 105 to position valve spool 107 to modify the flow of fluid. As can be seen from FIG. 17 fluid under pressure is supplied through line 109 and exhaust is provided by sump line 110. Both lines are connected to the internal ducting to cylinder 111 in which the spool type valve member 107 moves to control the fluid flow. A duct 112 connects cylinder 99 to the valve cylinder 111 on the side of connection shaft 97 and duct 113 (including suitable external tubing 113a) connects the cylinder 99 to valve cylinder 111 on the opposite side of the piston (the end adjacent the piston connection to the frame 10). In the position shown the fluid flow is by-passed through ducts leading directly from supply line 109 to exhaust line 110. However, if the cylinder is to be moved to the right as viewed in FIG. 17 the pressure line 109 will be connected with the right end of the cylinder 99 through duct 113 and the exhaust will be connected to the cylinder on the opposite side of the piston through duct 112. As a consequence of pressure being fed to the right side of the piston the cylinder will be moved to the right. If the spool valve 107 is moved to the left the connection will be reversed and the cylinder, and hence rod 97 coupling it to the mechanical system will be moved to the left.

It will be seen then that the stem 105 actually acts on a resiliently centered block 115 which is connected to the spool valve 107 to produce the type of action described. The arrangement is preferably such that motion tending to move the cylinder in one direction or the other automatically mechanically produces the type of valve setting which causes hydraulic movement in that direction. Moreover, because of the hydraulic arrangement should the device tend to become unbalanced at any given setting the hydraulic forces will immediately react to restore its position to that demanded by the mechanical actuator. Thus, with a relatively small amount of power from any remote location sufficiently great power to control and completely stabilize an impacter is obtained.

Figure 2:
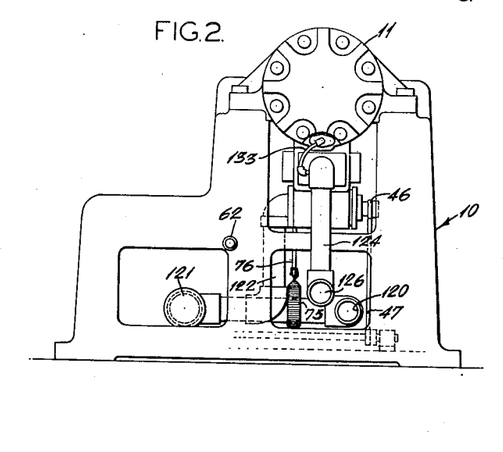
FIG. 2 is an end elevation viewing the machine of FIG. 1 from the left-hand end thereof.
Figure 3:
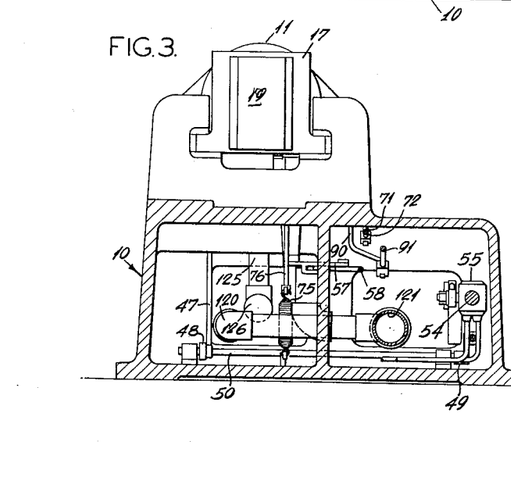
FIG. 3 is a sectional view taken along line 3—3 of FIG. 1.
Figure 5:
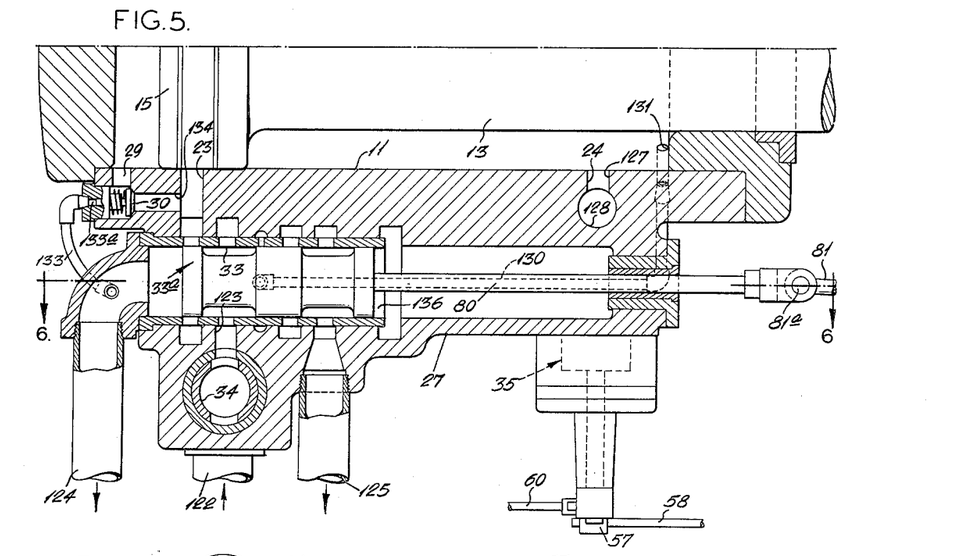
FIG. 5 is an enlarged fragmentary view of a detail shown in FIG. 4.

Before describing in detail the action of the impacter it will be well to review the steam connections or fluid connections to the main cylinders 11 and 12 and these may be seen primarily by reference to FIG. 4, with perhaps some reference to FIGS. 2 and 3. The main supply of steam is fed in through input duct 120 which distributes through ducts 121 to suitable risers 122. Each input riser 122 feeds through throttle valve 34 such as seen in FIG. 5 and connects with the control valve through duct 123. There are two exhaust risers 124 and 125 through which fluid may be exhausted to main exhaust duct 126. As seen in FIG. 5 riser 124 is connected to the end of the cylinder 33 and riser 125 is connected to the opposite side of the control valve 33 from the duct 123.

Figure 6:
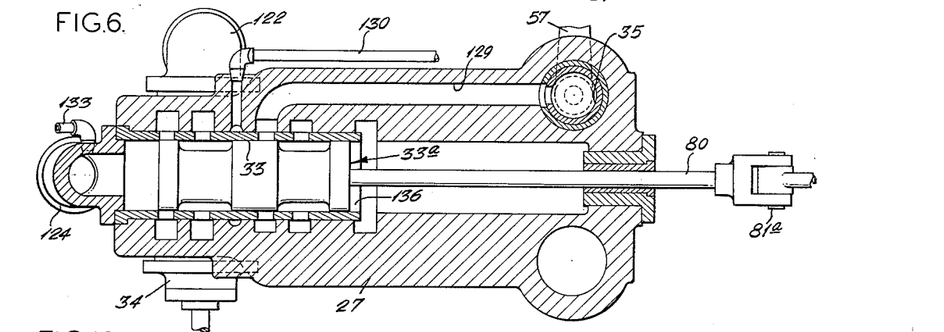
FIG. 6 is a sectional view taken along line 6—6 of FIG. 5.

FIGS. 5 and 6 illustrate how the control valve is connected to the cylinder 11. Cylinder 11 is provided with fluid ducts 23 and 24. Duct 24 as seen in FIG. 5 has a vertical drop 127 terminating in a horizontal line 128 to correcting valve 35. Correcting valve in turn has a duct 129 which is seen in FIG. 6 as back to the portion of the valve in which the spool 33a rides. In addition to the main duct 24 there is an auxiliary duct 130 seen mostly in dotted lines in FIG. 5 which has a small diameter port into the valve laterally offset to the left of the port of duct 129. The port into the cylinder 131 is at the extreme forward end of the cylinder so positioned that the piston will never go beyond it. In similar position at the opposite end of the cylinder is relief duct 29. Duct 29 has a spring biased check valve 30 biased to normally closed position and so located that exhaust through duct 29 tends to aid in holding valve 30 closed so that when fluid is flowing out duct 29 it flows through restricted orifice 133a into by-pass duct 133 and thence into the main exhaust duct 124. When the piston prevents flow into the main cylinder duct 23 (see FIG. 5), fluid flow into duct 23 will flow through duct 134 past check valve 30 into duct 29 and initiate movement of the piston sufficiently far to clear duct 23, after which flow can proceed through duct 23 into the cylinder to drive the rams together.

Each of the ducts described terminate at cylinder 33 in an annular recess which is numbered the same as the duct but with the addition of the letter *a* thereto. It will be appreciated that between the annular recesses and the cylinder is a sleeve 136 which is provided with as many and as large openings as are required to accomplish the type of flow necessary in the particular instance.

Figure 10:
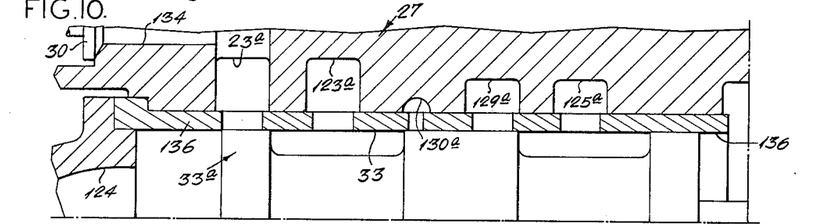
FIG. 10 is a detail view of part of the structure shown in FIG. 5 showing the control valve piston in a neutral or non-operative position for the control valve.
Figure 11:
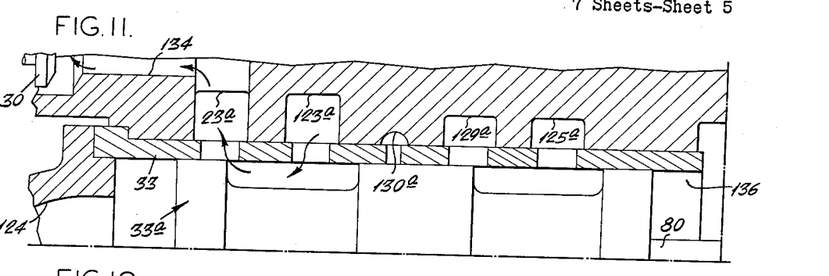
FIG. 11 is a view similar to FIG. 10 showing the control valve piston in a position to move the ram from left to right as shown in FIG. 4.

The neutral position of the control valve 33a is shown in FIG. 10. In operation it may be assumed that the spool 33a of the control valve 33 is first moved to the position shown in FIG. 11 if the piston 15 begins at the position shown in FIG. 5. If this is the case the initial flow will be through duct 23 and through by-pass duct 134 and duct 29 behind the piston to move it until the end of the piston clears the duct 23 after which flow will continue through duct 23. Meantime, fluid is exhausted through duct 24 by way of duct 129. As shown in FIG. 11 flow enters channel duct entrance 123a to flow into duct 123. Flow leaves the cylinder through duct 129 which is connected to duct outlet 125a.

By the connection to the sensing lever 68 the piston is first moved by the actuator 98 into the proper position for the flow shown in FIG. 11 to occur. Thereafter as the ram moves forward and the lever rotates the piston is pulled toward the center of the machine (to the right in the drawing) until it again occupies the position shown in FIG. 10 at the point of impact of the ram. Thereafter, in order for the rams to be retracted, the piston must be moved to a position shown in FIG. 12 so that fluid can flow from port 123a and to by-pass port 130a and can be exhausted through duct 23 to port 23a and out the exhaust duct 124. Moving the piston initially to the position shown in FIG. 12 may cause the ram to return only part way back, for example, to the position shown in FIG. 4 and this may be done in the event that a short stroke is desired. If a longer, heavier stroke were desired the piston could be moved further forward than shown in FIG. 12 and the piston would not tend to shut off the duct 130a as quickly so that the ram would have an opportunity to return to its initial position shown in FIG. 5.

Figures 12, 13:
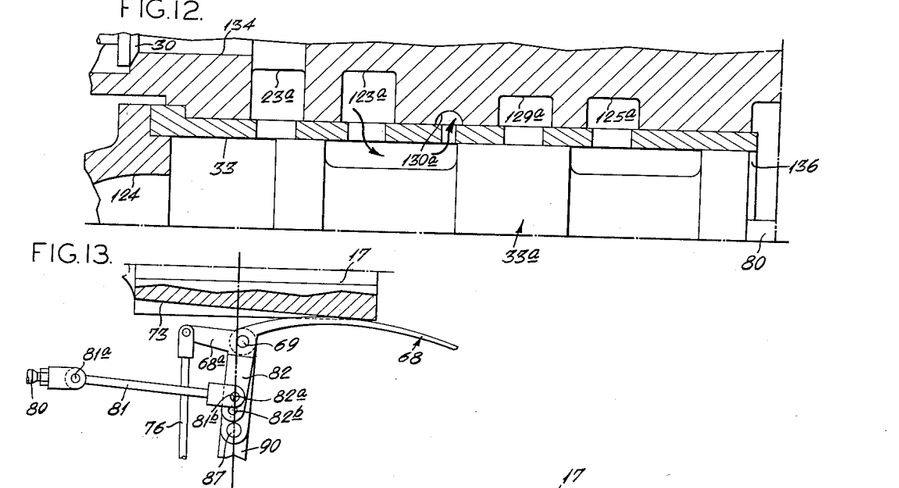
FIG. 12 is a view similar to FIGS. 10 and 11 with the control valve piston in position to move the ram from right to left as shown in FIG. 4.
FIG. 13 is a detail view showing the sensing structure as shown in FIG. 4 in starting position assuming the piston of the control valve in the position of FIG. 10.
Figure 14:
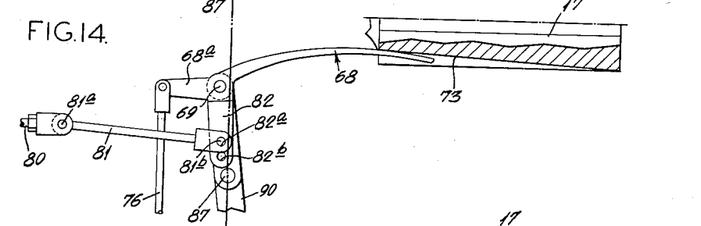
FIG. 14 is a detail view similar to FIG. 13 with the structure in position for the control valve to be in the condition shown in FIG. 11.
Figure 15:
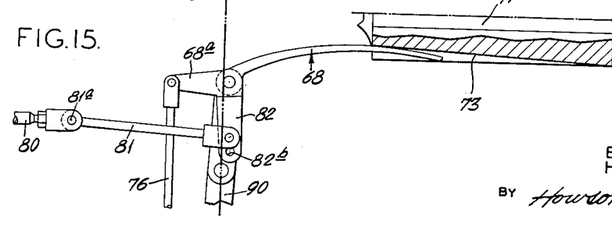
FIG. 15 is a detail view similar to FIGS. 13 and 14 with the structure positioned so that the control valve will be in the condition of FIG. 12.

FIGS. 13, 14 and 15 show the actual way in which the piston is positioned through control lever 90 and as previously described in response to actuator 98. FIG. 13 represents the position in which the ram is back, and in the condition shown the control valve piston is on center so that all ports are closed. In order to actuate the valve the lever 90 (FIG. 18) is pulled to the right to rotate the structure to the position shown in FIG. 14. This moves the piston to the position shown in FIG. 11 to initiate the stroke and by the time the ram has reached its forward position represented in FIG. 14 lever 82 has rotated sufficiently to impart sufficient horizontal linear motion to the piston in the position shown in FIG. 11 and back to the approximate position represented in FIG. 10. Then, in order to return to the ram the lever 90 is again actuated to position the piston 33a to the position shown in FIG. 12 thus moving the lever structure 68, including arm 82 to the right without substantial rotation and moving rod 81 and the piston connected to it correspondingly to the right to a position shown in FIG. 12. As the ram returns the sensing lever 68 will be moved downwardly and lever 82 will rotate towards the piston to the left which will push the piston to return to its neutral position of FIG. 10.

From a reference to FIGS. 13 through 15 it will be appreciated that the nature of the arrangement is such that the movement of pin 69 and the whole sensing lever assemblage by rotation of lever 90 produces effectively the same amount of linear movement of the piston as that produced by action of the cam 73 on sensing lever 68.

It is clear then that in order to operate in the way described above, the adjustment must be such that the amount of linear movement produced by the total travel of the ram is equal to the linear movement produced by rotation of lever arm 90. If the amount of linear movement produced by the ram exceeds that produced by rotational lever arm 90 a different result occurs. For example, assume that the lever is moved from the neutral position shown in FIG. 13 to the position shown in FIG. 14 but in the course of movement of the sensing lever 68 arm 82 is caused to move rod 81 and the piston 33 further than it was moved in the previous description. Then instead of restoring the piston to the position shown in FIG. 10 the piston will be moved from the position shown in FIG. 11 to a position approaching the position shown in FIG. 12. Thus the rams will no sooner reach impact than they will be in position to automatically return to a position for initiating another stroke. However, in returning, it will return to the position of actuation of FIG. 11 rather than to the rest position and another stroke will occur. This action will repeat again and again until the whole structure is returned to the position shown in FIG. 13 whereby when the ram moves back it will of necessity be in the neutral position of FIG. 10.

In accordance with the present invention it is not necessary to design separate actuators in order to accomplish this result. Rather, it is merely necessary to supply a somewhat longer lever through arm 82 which will give a correspondingly longer linear throw to the piston's movement. This is accomplished in accordance with the present invention by providing alternate pivot holes 82a and 82b for pin 81b in lever 82. The hole in which the pin 81b is shown in all of the drawings is hole 82a and another hole 82b below this hole is provided such that when pin 81b is removed from hole 82a and replaced in hole 82b, the stroke of the piston will be sufficiently increased to give the reciprocating repeated motion described.

Throughout this specification there have been numerous references to connecting links, levers and other mechanical connection elements. Reference to the drawings will indicate that the connections at one or both ends of these links are pin or pivot connections. One skilled in the art would know from context that pivoted connections are required in such positions so that such connections have been in certain cases illustrated but not described.

Although but a single embodiment of the present invention has been described it will be clear to those skilled in the art that many embodiments in accordance with the present invention will be apparent to those skilled in the art. All such modifications within the scope of the claims are intended to be within the scope and the spirit of the present invention.

We claim:

1. A control system for a mechanical fabricating ram device having a ram movable relative to a fixed frame under the urging of a fluid actuating system comprising a control valve for controlling the fluid actuating the ram, said control valve having a piston whose position in the valve determines whether the ram remains stationary or moves and in which direction it moves, a position sensing element on the frame and cooperating with the ram for sensing the position of the ram relative to the frame to cause said sensing element to assume a specific position representative of each ram position relative to the frame, coupling means connecting together the piston of the control valve and the sensing element so that as the sensing element moves it moves the piston so that the piston assumes a specific position corresponding to each specific position of the sensing element, and means for adjusting the position of the position sensing element relative to the frame, adjustment being effective to change the specific position of the piston for given ram positions.

2. The control system of claim 1 in which adjustment means is provided whereby the position sensing element may be shifted so that different sets of control valve piston positions result from given corresponding ram positions.

3. The control system of claim 1 in which the coupling between the position sensing means and the control valve piston may be modified to obtain different ranges of piston movement.

4. A control system for a mechanical fabricating ram device having a ram movable relative to the fixed frame under the urging of a fluid actuating system comprising a control valve for controlling the fluid actuating the ram, said control valve having a piston whose position in the valve determines whether the ram remains stationary or moves and in which direction it moves, a pivoted lever supported relative to the frame in position to be urged against a surface on the ram, spring means urging the lever to rotate about its pivot and into said ram surface, the ram surface and lever arrangements being such that the lever has a specific position corresponding to each ram position, coupling means connecting together the piston of the control valve and the lever so that for each position of the lever there is a different piston position, and means for adjusting the position of the lever pivot relative to the frame whereby the position of the piston is changed for a given ram position.

5. The control system of claim 4 in which an adjustment means is provided to shift the support to which the lever is pivoted whereby corresponding ram positions will result in different control valve positions.

6. The control system of claim 5 in which the coupling between the pivoted lever and the control valve piston may be modified to obtain different ranges of piston movement.

7. A control system for an impacter having aligned spaced rams adapted to be driven together relative to a fixed frame under the urging of a fluid actuating system comprising a control valve for controlling the fluid actuating each ram, said control valve having a piston whose position in its valve determines whether its ram remains stationary or moves and in which direction it moves, a pivoted sensing lever associated with each ram supported relative to the frame in position to be urged against a surface of the ram, spring means urging each lever to rotate about its pivot against said ram surface, the surface and lever orientation being such that the position of the lever changes for each ram position, coupling means connecting together the piston of the control valve and the lever associated with its ram so that for each lever position there is a corresponding piston position, and means for simultaneously adjusting the positions of both lever pivots relative to the frame whereby each system is correspondingly adjusted.

8. The control system of claim 7 in which adjustment is provided whereby the pivot of the sensing lever may be shifted so that different sets of control valve piston positions result from corresponding ram positions.

9. The control system of claim 8 wherein the pivoted lever is provided with alternative means for coupling to the control valve piston whereby the same amount of rotation will produce repeated action of the ram in one coupling arrangement and one stroke operation of its associated ram in the other coupling arrangement.

10. The control system of claim 8 in which the coupling includes a crank arm fixed relative to the sensing lever pivot and having a radial component relative to the pivot whereby attachment of a coupling link connected to the control valve at different radii will effect the different types of action required where the crank arm moves through a relatively small arc so that a given point on the arm has motion largely in the direction of piston movement.

11. The control system of claim 8 whereby means for simultaneously adjusting the positions of both lever pivots relative to the frame is a pivoted sub-frame structure pivoted on the main frame about an axis parallel to the axis of the sensing lever pivots.

12. The control system of claim 11 in which the members for simultaneously adjusting the positions of both sensing lever pivots relative to the frame are each composed of a suitable frame member having an actuating member in the form of a lever or crank arm attached thereto whereby the means which control the position of the frame may actuate the lever or crank arm.

13. The control system of claim 10 in which the lever or crank arm in each case is attached by a link to a rocker arm, the position of which is determined by an actuator.

14. A control system of claim 13 in which correction valves are provided and the sub-frames for adjusting the positions of both lever pivots relative to the main frame are also provided with lever arms for connection to the correction valves in order to keep the ram movements in phase with one another.

15. The control system of claim 14 in which the lever arms for connection to the correction valves are connected to a rocker arm which is pivoted in a medial plane between the rams on a lever in said plane, so that out-of-balance between the ram positions causes said lever to move out of said medial plane, and suitable connection links between said lever and correction valve whereby the correction valves are differentially operated in opposite directions to slow the ram which is ahead and to speed the ram which is behind.

16. The control system of claim 10 in which the lever is provided with a second crank arm which regulates the control valve through a connection link.

17. The control system of claim 16 in which the connection link is adjustable from one radius relative to the sensing lever pivot to another radius in order to change the ram action from repeating to single stroke or vice versa.

18. The control system of claim 10 in which the ram is provided with throttle valves and in which a separate actuator is provided to simultaneously adjust said throttle valves in order to adjust the speed of the ram.

References Cited in the file of this patent

UNITED STATES PATENTS

| | | |
|---|---|---|
| 2,545,921 | Goodwillie et al. | Mar. 20, 1951 |
| 2,729,943 | Clarke et al. | Jan. 10, 1956 |
| 2,761,285 | Beecroft | Sept. 4, 1956 |
| 2,782,603 | Beecroft | Feb. 26, 1957 |